United States Patent Office 3,344,087
Patented Sept. 26, 1967

3,344,087
POLYMERIC PHOSPHORUS-NITROGEN COMPOUNDS AND THE PRODUCTION THEREOF
Margot Becke, Heidelberg, and Dieter Neubauer, Ludwigshafen (Rhine), Germany, assignors to Olin Mathieson Chemical Corporation, a corporation of Virginia
No Drawing. Filed Mar. 31, 1961, Ser. No. 99,676
Claims priority, application Germany, Apr. 1, 1960,
B 57,311
7 Claims. (Cl. 260—2)

The invention described herein concerns a process for the production of polymeric phosphorus-nitrogen compounds by means of the reaction of phosphonitrile halides or derivatives thereof with organic nitrogen compounds.

Of the phosphonitrile halides, the phosphonitrile chlorides $(NPCl_2)_n$, are the best known and also most widely used products. Of these, a trimeric and a tetrameric product, as well as oligomeric materials with an average degree of polymerization of $n=10$–$15$ and a high polymeric rubber-like phosphonitrile chloride have been prepared in good yields. The chlorine atoms of the known phosphonitrile chlorides can be substituted with other groups in the sense of the formation of derivatives (H. Bode and H. Bach, Ber. dtsch. chem. Ges., 75, 215 (1942); M. Becke-Goehring, K. John and E. Fluck, Z. anorg. allg. Chem., 302, 103 (1959)).

In the reaction of trimeric phosphonitrile chloride with mono amines, two, three, four or six chlorine atoms can, for example, be substituted, while in the reaction of tetrameric phosphonitrile chloride substitution of eight chlorine atoms has been described. If aromatic o-diamines are employed as reacting agent for the phosphonitrile chloride, then, according to H. Bode, K. Bütow and G. Lienau (Ber. dtsch. chem. Ges., 81, 547 (1948)), two chlorine atoms attached to the same phosphorus atom are substituted in each case. On the other hand, according to the description of the same authors, two molecules of ethylene diamine react such that in every case only one of the amino groups reacts with one of the chlorine atoms of the phosphonitrile chloride causing substitution of the chlorine. Two chlorine atoms of the phosphonitrile chloride are substituted, then, by two ethylene diamine groups. The HCl, which is thereby released, is bound by the free amino group of the ethylene diamine. The substitution products of the phosphonitrile chlorides which are described are well-defined, monomeric compounds.

It is known that under specialized conditions a polymeric material can be obtained from phosphonitrile chlorides and amines. Under reduced pressure at 200–400° C., butyl amine reacts with phosphonitrile chloride to form a resinous material (Lipkin, United States patent specification No. 2,214,769). These conditions of temperature are sufficient, however, to effect a fundamental change in the phosphonitrile chloride molecule itself, as evidenced, for example, by the formation of rubber-like polymers from $(NPCl_2)_3$ under such conditions. Condensation products of a resinous nature have likewise been obtained by reacting phosphonitrile chloride polymers with chloroaniline and urea (Hurley, United States patent specification No. 2,637,704). Further, resinous condensation products were obtained from the reaction of secondary and tertiary aryl amines with trimeric or tetrameric phosphonitrile chlorides under increased pressure and elevated temperature (Brown, United States patent specification No. 2,374,646).

It is an object of our invention to prepare polymeric phosphorus nitrogen compounds, under conditions of normal temperature and in the absence of increased pressure, from organic nitrogen compounds and phosphonitrile halides, especially phosphonitrile chlorides of different degree of polymerization, or with the derivatives of such halides in which a portion of the halogen atom is substituted, especially by organic radicals.

In the context of the invention, the organic nitrogen compounds to be employed are those compounds, which contain at least two nitrogen atoms, which are primary and/or secondary, and which in every case are joined with at least one aliphatic or hydroaromatic group, or, if necessary are connected with two such groups and which are separated from each other by at least three carbon atoms, or at least are in such corresponding distance apart.

In the context of the invention, therefore, nitrogen compounds of the general formula $R_1HN_1RN_2HR_2$ will be employed, wherein the two nitrogen atoms are designated $N_1$ and $N_2$. The substituents $R_1$ on $N_1$ can, independently from $N_2$, be hydrogen or some other radical of choice, as long as $N_1$ is connected with R through an aliphatic or hydroaromatic radical or when R itself represents such a radical. Otherwise, if $N_1$ is not connected with R in the aforementioned manner, that is, when R does not have the above-mentioned significance, $R_1$ must be connected with $N_1$ through an aliphatic or hydroaromatic radical, or, $R_1$ must itself represent such a radical. In this sense, the same applies for $N_2$ with respect to its substituents $R_2$ and R. In any event, however, in order to obtain compounds which are useful, in the sense of the invention described herein, at least 3 carbon atoms or a distance corresponding thereto, e.g., —C—O—C— or —C—N—C—, must be maintained between two nitrogen atoms which fulfill the above-mentioned conditions. It is essential that at least two nitrogen atoms of the type mentioned possess such a distance from each other, even though other nitrogen atoms complying with the aforementioned requirements are inserted between two such nitrogen atoms and the distances thus arising between the neighboring nitrogen atoms originating in every such case are shorter. It is hence a question here of compounds which contain at least two amino or two imino—or one amino and one imino nitrogen, atom, whereby the amino nitrogen atom(s) must be attached to aliphatic or hydroaromatic radicals and the imino nitrogen atom(s) must be joined with at least one aliphatic and/or at least one hydroaromatic radical.

It is, of course, possible, and also of pertinence to the details of the invention, to employ also such materials as provide or set free nitrogen compounds of a type applicable to the purposes of the invention only at the moment of reaction with the phosphonitrile compound. Likewise, the invention includes in its scope the use of mixtures of nitrogen compounds of the type herein described, if necessary, together with other compounds.

The polymeric materials obtained are in every case substances which exhibit thermoplastic behavior and which are furthermore difficultly flammable if indeed nonflammable.

Nitrogen compounds can be used to advantage, in which the two nitrogen atoms are separated by 5 or more, preferably 6 to 8, carbon atoms. The use of compounds in which the two nitrogen atoms are separated by substituted methylene groups has also proven valuable.

Furthermore, compounds can be used, wtihin the scope of this invention, in which the two nitrogen atoms are present in the form of terminal amino groups. Further, the use of compounds which contain only aliphatic or hydroaromatic groups or both or several such groups together with amino and/or imino groups, also leads to good results.

The use of penta-, hexa-, hepta-, or octa-methylene diamine has proven to be of special advantage.

Together with the use of trimeric, tetrameric or more highly polymerized phosphonitrile dichloride, the employment of phosphonitrile halides, especially the chlorides, in which a portion of the halogen atoms has been substituted, has been seen to be advantageous. Instead of using substituted phosphonitrile compounds, it is naturally also possible, as an equivalent and efficient method for the achievement of the same purpose, to perform the substitution only after reacting the phosphonitrile halide with the nitrogen compound. Accordingly, the reaction can be commenced also with only slightly substituted phosphonitrile halides or with mixtures of unsubstituted and higher substituted phosphonitrile halides and further substitution carried out after reaction with the nitrogen compounds.

It is advantageous that at least 0.1 mole, preferably 0.25–3 moles, of nitrogen compounds will be consumed for each gram atom of phosphorus during the reaction. Such a reaction course, in which, for example, 0.5–2.5 moles of nitrogen compound are consumed, calculated on the basis of one gram atom of phosphorus of the reacting phosphonitrile compound, can be ensured in the usual manner, that is, by employing the reacting agents in suitable proportion of quantities.

The reaction for the polymeric phosphorus nitrogen compound can be conducted in homogeneous phase as long as a comon solvent for the nitrogen compound and for example, the phosphonitrile chloride is at hand. Possible solvents include, for example, tetrahydrofuran, dioxane or ethyl ether. In this case, one can proceed such that the already dissolved nitrogen compound is added to the solution of phosphonitrile chloride in a solvent. The reaction then occurs readily, without heat being applied, yielding a polymeric reaction product, incorporating the nitrogen compound, as used in the scope of the invention, along the hydrochloride of the corresponding nitrogen compound. The hydrochloride is separated from the reaction product by conventional techniques, e.g., filtration. The organic solvent is removed, leaving the desired polymeric phosphorus nitrogen compound. In this material, phosphonitrile chloride radicals are linked by diamino groups. The products so obtained are then no longer soluble in organic solvents, but are, at best, still capable of swelling. The material can be deformed after being heated to 80–200° C.

An analogous principle applies to the preparation of polymeric phosphorus-nitrogen compounds when, for example, the polymeric phosphonitrile chloride used for the reaction is no longer soluble in the solvent employed for the nitrogen compound itself, but rather only swells with such a solvent, as in the case, for example, when the rubber-like polymer is used as phosphonitrile chloride.

The reaction can also be carried out in heterogeneous phase, the nitrogen compound being dissolved for example in water, the phosphonitrile chloride being dissolved in a solvent which is immiscible with water. The two solutions are agitated by shaking together over a period of time. Suitable pairs of solvents or carrier media are, amongst others, ether/water and benzene/water. The reaction product passes into the organic phase and can be isolated after evaporation of the solvent.

The polymeric phosphorus nitrogen compounds obtained by this process can be used as synthetic materials which are difficultly flammable. From these products, films can be produced which are flammable only with difficulty and which represent a fire protection for the material which they cover. These substances are further suitable as adhesives for wood, glass, cellulose, etc.

In the following examples, which are given to illustrate, but not to limit, the invention, "parts" are parts by weight and all temperatures are in centigrade degrees.

*Example 1*

139 parts of trimeric phosphonitrile chloride are dissolved in 890 parts of dry tetrahydrofuran at room temperature and the solution is transferred to a separating funnel. Then 93 parts of hexamethylene diamine are dissolved in 1330 parts of tetrahydrofuran and any small amounts of undissolved carbonate are filtered off. The diamine solution is poured slowly at room temperature with swirling into the separating funnel. Hexamethylene diamine dihydrochloride soon separates, with considerable evolution of heat. The reaction mixture is allowed to cool and the salt is then separated by filtering or centrifuging. Since the hydrochloride is very finely crystalline, it is more convenient to separate it by pouring 200 parts of cold distilled water into the reaction mixture and shaking vigorously. The resulting aqueous salt solution is no longer miscible with tetrahydrofuran and separates out. The liquids are allowed to stand for approximately 30 minutes and then separated. The tetrahydrofuran remaining in the separating funnel is then dried with sodium sulphate and evaporated on a boiling water bath. A yellowish resinous substance remains, which still retains some solvent. The resin can be extracted with benzene, ether, methanol, acetone, or tetrachloroethane. It can be separated from concentrated solution again by the addition of lightly boiling petroleum ether. The remaining traces of solvent can be removed from the substance by prolonged evacuation, preferably in high vacuum. A white voluminous mass is then obtained which is no longer tacky, but which when warmed can be kneaded and stretched. This substance swells somewhat when in contact with solvents such as benzene, tetrahydrofuran or acetone.

The yield of this polymeric phosphorus-nitrogen compound is 143 parts. When precipitated once with petroleum ether, the resin parts. When precipitated once with petroleum ether, the resin gave an analysis of 21.2% C, 3.9% H, 17.3% N, 33.6% Cl, 22.9% P.

If the reacted materials are treated such that after evaporation of the main portion of the solvent evacuation is carried out for 7 hours, the residue is heated to 100° and again evacuated for 7 hours; the phosphorus-nitrogen compound obtained appears yellowish-brown, is glass-like and brittle and can easily be pulverized when cold. The compound swells in contact with solvent, as mentioned above. The yield of this substance is 140 parts (87% of theory on the basis of phosphorus). The analysis showed 20.2% C, 3.8% H, 17.2% N, 34.3% Cl, 22.9% P. If this substance is heated approximately 2 hours at 100°, a plastic, deformable mass is obtained, which becomes solid when cooled to room temperature. This mass contains 19.7% C, 4.2% H, 16.8% N, 34.3% Cl, 22.8% P. Hence, no profound chemical change occurs upon heating to about 100°.

*Example 2*

In accordance with the method described in Example 1, 35 parts of trimeric phosphonitrile chloride in 222 parts of tetrahydrofuran are reacted with 21 parts of octamethylene diamine, dissolved in 444 parts of the same solvent. After a period of reaction of about 10 minutes, 50 parts of water are added. The two layers are separated and the tetrahydrofuran layer dried with sodium sulphate. With a bath temperature of 100°, most of the tetrahydrofuran can be evaporated; the remainder is removed in vacuum. 40 parts of a tough, yellow resin remains as residue. The last traces of solvent can be removed in high vacuum. The resin contains 18.2% C, 14.7% N, 39.3% Cl, 22.0% P, 3.7% H. In its behavior this polymeric phosphorus-nitrogen compound is closely similar to that of the compound prepared as in Example 1, especially inasmuch as when heated for a long period of time in high vacuum, the resin is deformable after being heated to about 100° C.

*Example 3*

23 parts of tetrameric phosphonitrile chloride are dissolved in 222 parts of tetrahydrofuran. This is reacted, as described in Example 1, at room temperature with a solution of 19 parts of hexamethylene diamine in approximately 335 parts of tetrahydrofuran. In the exothermic reaction, a thick white precipitate is formed which settles out almost immediately. The precipitate consists of the diamine dihydrochloride and a polymeric phosphorus-nitrogen compound and it can be filtered off with ease. A smaller quantity of polymeric P-N compound remains in the solvent; the former can be obtained as described in Example 1. The precipitate is washed repeatedly with water and finally dried in a vacuum desiccator. In this way, 17 parts of a powdered substance are obtained which at about 180° under application of several atmospheres pressure can be pressed to a brittle, chalky mass.

*Analysis.*—19.7% C, 5.1% H, 16.4% N, 18.5% Cl, 22.7% P.

Example 4

50 parts of rubber-like phosphonitrile chloride (compare M. Becke-Goehring and G. Koch, Chem. Ber. 92, 1188 (1959)) are reacted with 2670 parts of absolute tetrahydrofuran. The mixture is stirred vigorously for a longer period of time, in order to obtain as far as possible a partly colloidal solution of the rubber. 75 parts of freshly distilled hexamethylene diamine are dissolved in 890 parts of absolute tetrahydrofuran. After the filtering off of traces of carbonate, during which it is practical to exclude air, the hexamethylene diamine-tetrahydrofuran solution is added dropwise at room temperature, in the course of about 1 hour, to the suspension of the phosphonitrile chloride rubber in the tetrahydrofuran. During the dropwise addition, a white, finely divided precipitate separates out. The temperature in the reaction flask increases somewhat. After addition of the diamine, the reaction mixture is heated to boiling and this temperature is maintained under constant stirring for about 10 hours. The mixture is allowed to cool and then filtered while excluding moisture. The separated product is dried at about 100° in a stream of dry air. About 120 parts of a substance are obtained which consists of a polymeric phosphorus-nitrogen compound and hexamethylene diamine dihydrochloride. The hexamethylene diamine dihydrochloride can be extracted from this material with the aid of hot absolute ethyl alcohol. The phosphorus-nitrogen compound which remains can be dried in vacuum over phosphorus pentoxide and potassium hydroxide. Approximately 75 parts of a polymeric phosphorus-nitrogen compound are obtained. The analysis showed 14.8% P, 16.9% N, 11.6% Cl, 35.1% C, 7.9% H.

The white substance turns slowly yellow at about 184°: at 196°, it softens to a plastic mass, which hardens again on cooling to about 175°. The plastic mass can be shaped at will. The analysis of the heated, deformed mass revealed 14.4% P, 17.8% N, 8.3% Cl, 34.3% C, 8.1% H.

Example 5

23 parts of hexamethylene diamine are dissolved in 400 parts of distilled water and 35 parts of trimeric phosphonitrile chloride are dissolved in 720 parts of ether. Both solutions are then placed in a pressure container and shaken vigorously for 30 minutes. The aqueous layer, which has a pH of about 13, is separated and discarded. The ether layer is dried with sodium sulphate, filtered and evaporated; towards the end, the evaporation is concluded in vacuum at 100°. 34 parts of a resinous substance remain. The yellowish resin exhibits behavior analgous to that of the product from Example 1. However, this resin dries much more slowly in air than the resin obtained in Example 1.

*Analysis.*—13.4% C, 2.9% H, 15.7% N, 24.5% P, 42.4% Cl.

Example 6

75 parts of oily phosphonitrile chloride with an average degree of polymerization of $n=6.2$ are dissolved in 1150 parts of dry ether. A solution of 113 parts of hexamethylene diamine in 1440 parts of ether is added dropwise to the above solution with stirring. A thick white precipitate is formed with the evolution of heat. The mixture is allowed to cool and then filtered with suction. The white solid substance is freed from adhering ether, over sulphuric acid in a vacuum desiccator. The dry substance is then extracted with hot ethanol in a Soxhlet extracting apparatus. Approximately 60 parts of a white, non-flammable polymeric P-N compound remain, which is insoluble in the common solvents. Upon heating to about 120°, the substance becomes thermoplastically deformable and contains 36.2% C, 8.2% H, 17.6% N, 16.5% P, 11.1% Cl.

Example 7

35 parts of bis-dimethylamino-tetrachlorotriphosphonitrile are dissolved in 222 parts of dry tetrahydrofuran. Then 23 parts of hexamethylene diamine are dissolved in 356 parts of dry tetrahydrofuran and the second solution is slowly poured into the first. The reaction commences slowly, but is complete after about 30 minutes. 50 parts of water are then added, the layers separated and the upper layer is dried with sodium sulphate. The solvent is then evaporated to dryness; the final conditions constitute vacuum and a bath temperature of about 100°. 27 parts of a white, pulverizable mass remain, which is non-flammable and which becomes thermoplastic at approximately 70°. The substance contains 26.9% C, 6.2% H, 19.8% N, 20.9% P, 20.3% Cl.

Example 8

The polymeric phosphorus-nitrogen compound as produced in the second procedure of Example 1 is prepared as shown in that example. 10 parts of the polymeric phosphorus-nitrogen material of Example 1 are gradually added, as a dust, to 23 parts of liquid hexamethylene diamine at 100°. This 100° temperature is maintained for 2 hours. The contents are then allowed to cool and are washed repeatedly with cold water until the washings are free of chloride ion and react neutral. The residue is dried at 120°. It consists of 11 parts of a yellow, powdery substance, which becomes thermoplastic at about 220°. In this substance, the chlorine of the polymeric phosphorus-nitrogen compound has subsequently been substituted by amino groups.

*Analysis.*—36.1% C, 7.9% H, 19.9% N, 18.8% P, 6.2% Cl.

Example 9

52 parts of trimeric phosphonitrile chloride are dissolved in 290 parts of dry ether and 31 parts of pentamethylene diamine are dissolved in 1100 parts of dry ether. The second solution is poured into the first with shaking. After the mixture has been allowed to stand for about 12 hours at room temperature, the precipitate which has separated out in filtered off. The ether is evaporated off at a bath temperature of about 50°. A yellow resin remains, which still retains some solvent. The remaining traces of solvent are removed by evacuating towards the end at 100°; the mass temporarily swelling up. The yield is 45 parts of a polymeric phosphorus-nitrogen compound which becomes thermoplastic at about 35°. Analysis of the substance after being heated at 100° in vacuum for about 15 hours: 14.5% C, 2.8% H, 42.0% Cl.

Example 10

70 parts of trimeric phosphonitrile chloride are dissolved in about 445 parts of dry tetrahydrofuran and 84 parts of 4,4'-diamino-dicyclohexyl methane are dissolved in 710 parts of dry tetrahydrofuran. The two solutions are combined in the manner described in Example 9. The mixture is allowed to stand for 16 hours at room temperature and is then filtered through a sufficiently fine sintered glass filter to remove the precipitate, which is subsequently washed with tetrahydrofuran. The tetrahydrofuran is evaporated off; towards the end, at a bath temperature of 100°. A yellowish resin, which still contains some solvent results. During the removal of the last traces of solvent by evacuating, the resin swells up to a colorless, voluminous mass, which becomes thermoplastic at about 60°. The yield of this polymeric phosphorus-nitrogen compound is 74 parts.

*Analysis.*—34.1% C, 5.6% H, 12.6% N, 17.5% P, 28.0% Cl.

We claim:
1. Process for preparing polymeric, thermopalstic phosphorus-nitrogen compounds by mixing a phosphonitrile halide with a first carrier medium selected from the group consisting of tetrahydrofuran, dioxane, ether and benzene; separately placing an aliphatic nitrogen compound having the formula $R_1HN_1RN_2HR_2$ where R is a divalent saturated hydrocarbon of 5 to 13 carbon atoms and $R_1$ and $R_2$ are hydrogen in a second carrier medium selected from the group consisting of water and said first carrier media; said aliphatic nitrogen compound being employed in the range of 0.25 to 3.0 gram moles per gram atom of phosphorus in said phosphonitrile halide; mixing together said phosphonitrile halide-containing first carrier medium and said aliphatic nitrogen compound-containing second carrier medium; agitating said mixed media to produce said polymeric, thermoplastic phosphorus-nitrogen compound and separating said polymeric, thermoplastic phosphorus-nitrogen compound from said media.

2. Process of claim 1 in which said aliphatic nitrogen compound is hexamethylene diamine.

3. The polymeric, thermoplastic phosphorus-nitrogen compound prepared by the process of claim 1.

4. The polymeric, thermoplastic phosphorus-nitrogen compound prepared by the process of claim 1 in which said phosphonitrile halide is the trimer of the formula $(PNCl_2)_3$ and said aliphatic nitrogen compound is hexamethylene diamine.

5. The polymeric, thermopalstic phosphorus-nitrogen compound prepared by the process of claim 1 in which said phosphonitrile halide is the tetramer of the formula $(PNCl_2)_4$, and said aliphatic nitrogen compound is hexamethylene diamine.

6. The process of claim 1, wherein the phosphonitrile halide is of the formula $(PNCl_2)_x$ wherein $x$ is greater than 2.

7. The process of claim 1, wherein the reaction is carried out in a homogeneous phase in a solvent common to both reacting agents.

References Cited

UNITED STATES PATENTS

| | | | |
|---|---|---|---|
| 2,214,769 | 9/1940 | Lipkin | 260—2 |
| 2,866,773 | 12/1958 | Redfarm | 260—2 |

FOREIGN PATENTS 568,594    4/1945    Great Britain.

OTHER REFERENCES

Bode et al.: Chemische Berichte, vol. 81, pp. 547–552 (1948).

SAMUEL H. BLECH, *Primary Examiner.*

H. N. BURNSTEIN, WILLIAM H. SHORT,
*Examiners.*

J. T. BROWN, H. D. ANDERSON,
*Assistant Examiners.*